United States Patent [19]
Grebe, Jr. et al.

[11] 4,287,774
[45] Sep. 8, 1981

[54] MAGNETIC FLOWMETER WITH ULTRASONICALLY CLEANED ELECTRODES

[75] Inventors: John C. Grebe, Jr., Norristown; William R. Freund, Jr., Hatfield, both of Pa.

[73] Assignee: Emerson Electric Co., St. Louis, Mo.

[21] Appl. No.: 82,763

[22] Filed: Oct. 9, 1979

[51] Int. Cl.³ .............................................. G01F 1/60
[52] U.S. Cl. ................................................. 73/861.17
[58] Field of Search ........... 73/861.12, 861.16, 861.17; 204/222, 223

[56] References Cited

U.S. PATENT DOCUMENTS 3,316,762  5/1967  Westersten ................. 73/861.17
3,479,873  11/1969  Hermanns ................. 73/861.12

FOREIGN PATENT DOCUMENTS 54-47911  11/1979  Japan ................. 73/861.12

Primary Examiner—Charles A. Ruehl
Attorney, Agent, or Firm—Polster, Polster and Lucchesi

[57] ABSTRACT

A magnetic flowmeter having a pair of opposed pick-up electrodes equipped with ultrasonic cleaning transducers powered from an ultrasonic generator. A sequencer places the flow signal processing system in a hold state during activation of the transducers so as to eliminate interference with the flow signal.

9 Claims, 6 Drawing Figures

MAGNETIC FLOWMETER WITH ULTRASONICALLY CLEANED ELECTRODES

BACKGROUND OF THE INVENTION

This invention relates to magnetic flowmeters, and in particular to such flowmeters in which the pick-up electrodes are provided with ultrasonic cleaners.

In an electromagnetic flowmeter a magnetic field across a flow tube generates a voltage in a fluid flowing through the tube. The voltage, which is proportional to flow velocity (rate of flow), is sensed by a pair of electrodes in contact with the fluid. The flow-dependent voltage is amplified and converted by a signal processing system to produce an output signal for display or control.

It is now common practice to provide ultrasonic cleaners on the electrodes of magnetic flowmeters, particularly when the meters are used for metering slow-moving liquids which have a tendency to coat the electrodes. The ultrasonic cleaners may, for example, consist of ultrasonic transducers in the form of piezoelectric disks which are positioned in or on the electrode bodies and which are energized periodically by an ultrasonic frequency generator. The electrodes are shaped to cause the vibration of the transducer to be transmitted to the face of the electrode in contact with the fluid in the body of the flowmeter and clean the electrode face. Examples of suitable electrodes are shown, for example, in U.S. Pat. Nos. 3,771,361 to Reznick, 3,479,873 to Hermanns, and 3,229,129 to van Haagen (using a magnetostrictive transducer).

In the operation of magnetic flowmeters having ultrasonic electrode cleaners, the high voltage ultrasonic energy utilized to activate the ultrasonic transducers is capable of interfering with the low level flow-dependent analog output produced across the electrodes. To overcome such interference, it has been common to provide low-pass filters in the signal processing circuitry. The low pass filters, however, have not been completely effective, and errors have been introduced into the output signal during the cleaning process and during a subsequent recovery period.

SUMMARY OF THE INVENTION

One of the objects of this invention is to provide a magnetic flowmeter equipped with ultrasonically cleaned electrodes, in which the cleaning process does not produce any instability or error in the output signal.

Other objects will occur to those skilled in the art in light of the following description and accompanying drawing.

In accordance with this invention, generally stated, a magnetic flowmeter is provided comprising a body adapted to be connected in a flow system for measuring the flow of a fluid therethrough, means for generating a magnetic field in the fluid flowing through the body, a pair of electrodes in said body for producing a voltage dependent on the electric field generated in the fluid flowing through the magnetic field, signal processing means for converting the output voltage to an output signal, ultrasonic transducers associated with the electrodes for cleaning the faces of the electrodes when activated, and ultrasonic generator means for periodically activating the transducers, characterized by sequencing means for placing at least a part of the flow signal processing in a hold state during activation of the transducers so as to hold the output signal at a previous level and eliminate interference with the output signal by the ultrasonic generator.

Preferably, the magnetic field generating means are driven by pulses of current which produce periodic pulsed voltages across the electrodes. The signal processing circuitry operates cyclically on the voltage pulses to produce the output signal. The sequencing means includes means for communication between the signal processing system and the ultrasonic generator, so as to permit the signal processing system to complete a cycle before the ultrasonic signal is applied to the electrodes. Preferably, a switch is provided for opening the path through the signal processing system at an early point in the signal processing system, preferably directly following the differential amplifier which receives signals from each electrode and produces a flow-dependent signal. The switch is activated by the sequencing means to protect the signal processing circuitry while it is in its hold state. In the preferred embodiment, the sequencing means receives a warning signal indicative of activation of the ultrasonic generator prior to activation of the transducers, senses the end of a pulse processing cycle, and opens the switch until the warning signal is removed. In another illustrative embodiment, the sequencing means periodically stops the signal processing circuitry in a hold state at the end of a pulse processing cycle, and then signals the ultrasonic generator to activate the transducers. In another illustrative embodiment, the sequencing means receives a "ready" signal from the ultrasonic generator and then sends a "proceed" signal to the ultrasonic generator when the end of a pulse processing cycle is reached, the signal processing circuitry is in a hold state, and the switch is opened.

Other aspects of the invention are best understood with reference to the following description of the preferred embodiments.

DESCRIPTION OF THE PREFERRED EMBODIMENTS

Figure 1:
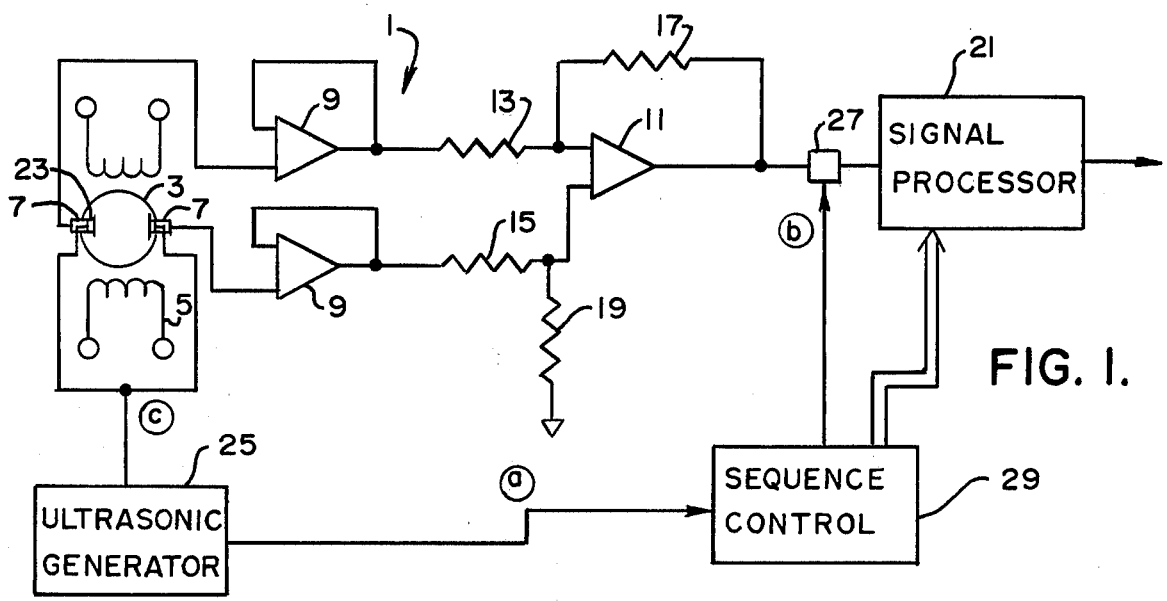
FIG. 1 is a circuit diagram illustrating a preferred embodiment of magnetic flowmeter of this invention, having the preferred ultrasonically cleaned electrode system of the invention.

Referring now to the drawings, and in particular to FIG. 1, reference numeral 1 indicates a magnetic flowmeter system incorporating the present invention. The flowmeter system 1 includes a flow tube 3, a pair of oppositely disposed electomagnetic coils 5 energized from a source of pulsed direct current, not shown, and a pair of electrodes 7 which sense a voltage generated by the flow of an electrically conductive fluid through the magnetic field produced by the coils 5 across the tube 3. The voltage across the electrodes 7 is isolated by voltage followers 9 and amplified by a differential amplifier 11, in accordance with the relationships among resistors 13, 15, 17 and 19. The amplified flow-dependent signal from the amplifier 11 is fed to a signal processing system 21 to produce an output signal for display or control purposes. All of these components may be conventional.

The electrodes 7 are provided with ultrasonic transducers 23, which are activated intermittently by an ultrasonic generator 25. These components may also be conventional.

In accordance with the preferred embodiment of the present invention, a semiconductor switch 27 is connected between the differential amplifier 11 and the signal processor 21. The switch 27 is controlled as indicated at b by a sequence controller 29, which also controls elements in the signal processor 21. Further in accordance with the preferred embodiment of the invention, the ultrasonic generator 25 is designed to produce a signal pulse at an input a of the sequence controller 29 before it produces an ultrasonic signal at the transducers 23 as shown at c.

Figure 2:
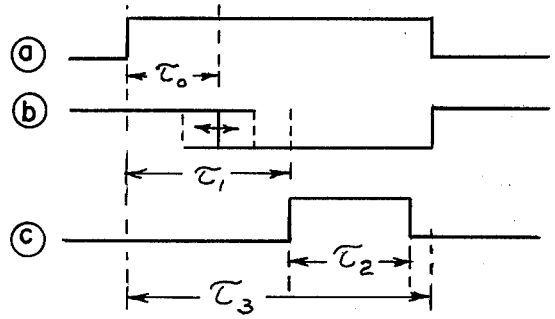
FIG. 2 is a timing diagram illustrating the operation of a sequencing device of the flowmeter system of FIG. 1.

The timing logic of the preferred system is best understood with reference to FIG. 2. The signal pulse at a is produced at a time $t_1$ before the production of an ultrasonic signal at c. Upon receiving the signal pulse, the sequence controller 29 causes the signal processor 21 to complete processing of any flow-dependent signal in the signal processor 21, and upon receiving the next pulsed flow-dependent signal halts the sequence with the output signal in a hold state and opens the switch 27. The length of time, designated $t_0$, required to complete the processing sequence will be variable if the timing of the ultrasonic generator 25 is independent of the timing of the sequence controller 29, as indicated by the horizontal arrow and dotted lines at b in FIG. 2. The ultrasonic generator 25 produces an ultrasonic signal at the transducers 23 for a period $t_2$, after which the signal pulse at a is terminated, and the sequence controller 29 resumes the processing of pulsed flow-dependent signals by closing the switch 27 and taking the signal processor out of its hold state. The total duration of the signal pulse at a is designated $t_3$. It will be seen that $t_1$ must be no less than $t_0$, and that $t_3$ must be no less than the sum of $t_1$ and $t_2$.

Figure 3:
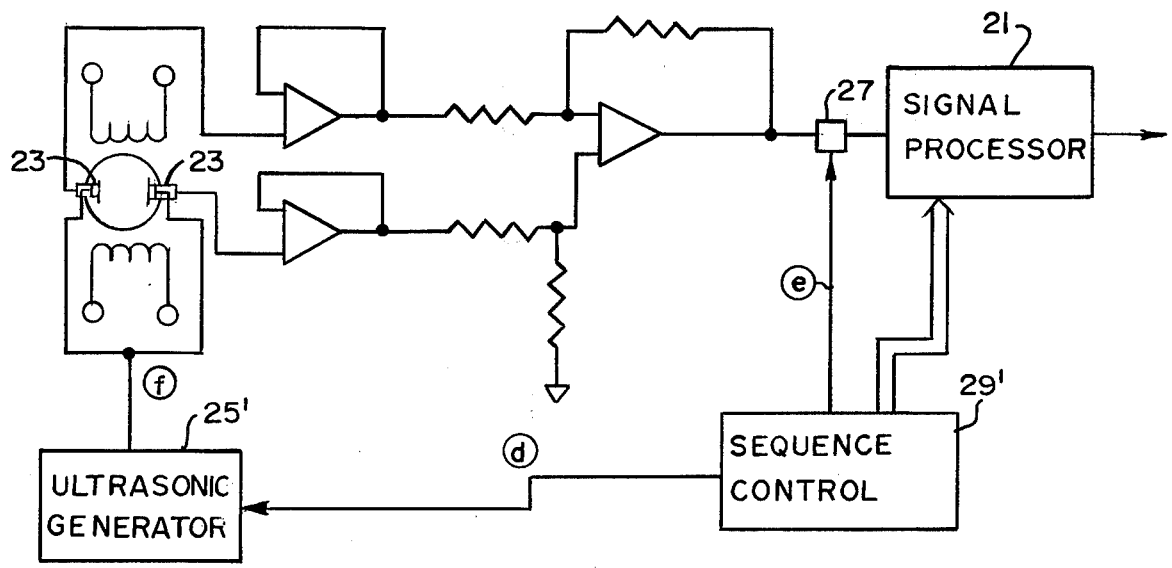
FIG. 3 is a circuit diagram illustrating a second embodiment of magnetic flowmeter of this invention, including an ultrasonically cleaned electrode system of the invention.

Referring now to FIG. 3, the second illustrative embodiment of magnetic flowmeter system of the present invention differs from the first embodiment in that the switch 27 is controlled as indicated at e by a sequence controller 29', which also controls elements in the signal processor 21. Further in accordance with the second embodiment of the invention, the sequence controller 29' is provided with a counting circuit which counts the number of flow signal pulses it has sequenced and after a predetermined number of sequences signals the ultrasonic generator 25', as shown at d, to produce an ultrasonic signal at the transducers 23 as shown at f.

Figure 4:
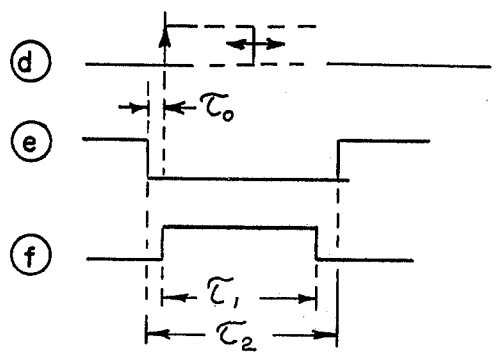
FIG. 4 is a timing diagram illustrating the operation of a sequencing device of the flowmeter system of FIG. 3.

The timing logic of this second system is shown in FIG. 4. After counting the predetermined number of flow signal processing sequences, the sequence controller 29' opens the switch 27 and places the signal processor 21 in a hold state, as indicated at e in FIG. 3, at a time $t_0$ before it produces a signal at d, causing the ultrasonic generator 25' to produce an ultrasonic signal at the transducers 23 for a period $t_1$ determined by the ultrasonic generator 25'. The length of the signal pulse need therefore be controlled only to the extent of being shorter than the duration $t_1$ of the ultrasonic signal. After a predetermined time $t_2$, the sequence controller 29' resumes the processing of pulsed flow-dependent signals by closing the switch 27 and taking the signal processor out of its hold state. It will be seen that $t_2$ must be no less than the sum of $t_0$ and $t_1$ for proper operation of this illustrative system.

Figure 5:
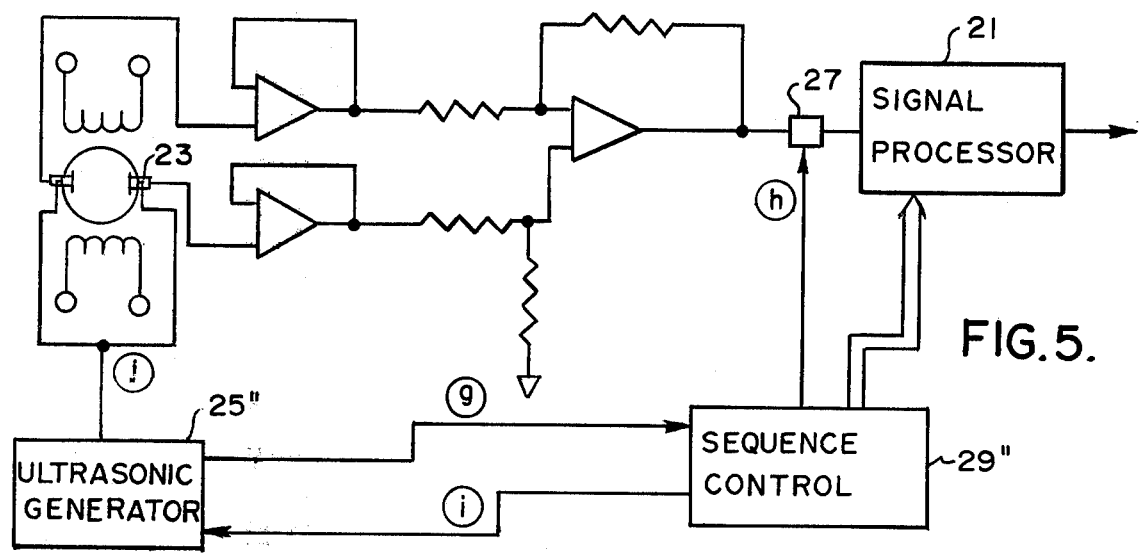
FIG. 5 is a circuit diagram illustrating a third embodiment of magnetic flowmeter of this invention, including an ultrasonically cleaned electrode system of the invention.

Referring now to FIG. 5, the third illustrative embodiment of magnetic flowmeter system of the present invention differs from the first embodiment in that the sequence controller 29'' returns a "proceed" signal to the ultrasonic generator 25'' when it has completed a signal processing sequence, rather than relying upon a predetermined delay. The switch 27 is controlled as indicated at h by the sequence controller 29'', which also controls elements in the signal processor 21. Two paths g and i are provided between the sequence controller 29'' and the ultrasonic generator 25''. The connection between the ultrasonic generator 25'' and the ultrasonic transducers 23 is identified as j.

Figure 6:
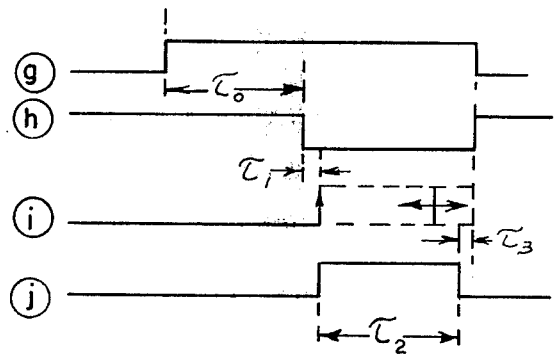
FIG. 6 is a timing diagram illustrating the operation of a sequencing device of the flowmeter system of FIG. 5.

The timing logic of this third system is shown in FIG. 6. As in the first embodiment, when the timing of the ultrasonic generator 25'' indicates that the transducers 23 should be activated, the ultrasonic generator 25'' produces a warning signal at the sequence controller 29'', as shown at g in FIG. 6. Upon receiving the signal pulse, the sequence controller 29'' causes the signal processor 21 to complete processing of any flow-dependent signal in the signal processor 21, and upon receiving the next pulsed flow-dependent signal halts the sequence with the output signal in a hold state and opens the switch 27. The length of time $t_0$ required to complete the processing sequence is substantially immaterial to the operation of the system. At a time $t_1$ after the switch 27 is opened, the sequence control 29'' sends a "proceed" signal to the ultrasonic generator 25''. The ultrasonic generator 25'' produces an ultrasonic signal at the transducers 23 for a period $t_2$. After a time $t_3$, the signal pulse at g is terminated, and the sequence controller 29'' resumes the processing of pulsed flow-dependent signals by closing the switch 27 and taking the signal processor out of its hold state. The total duration of the signal pulse at g is designated $t_3$. It will be seen that the length of the proceed signal at i is immaterial so long as it is less than $t_2$. It will also be seen that in this embodiment both the repetition rate and the duration of the ultrasonic generator 25'' may be altered at will without affecting the operation of the blanking system of the invention.

Numerous variations in the magnetic flowmeter system of the present invention, within the scope of the appended claims, will occur to those skilled in the art in light of the foregoing disclosure.

We claim:

1. In a magnetic flowmeter comprising a body adapted to be connected in a flow system for measuring the flow of a fluid therethrough, means for generating a magnetic field in the fluid flowing through the body, a pair of electrodes in said body for producing a voltage dependent on the electric field generated in the fluid flowing through the magnetic field, signal processing means for converting the output voltage to an output signal, ultrasonic transducers associated with the electrodes for cleaning the faces of the electrodes when activated, and ultrasonic generator means for periodically activating the transducers, the improvement comprising sequencing means for placing at least a part of said signal processing means in a hold state during activation of said transducers so as to hold said output signal at an instantaneous level, thereby eliminating interference with said output signal by said ultrasonic generator.

2. The improvement of claim 1 wherein said magnetic field generating means are driven by pulses of current which produce periodic pulsed voltages across said electrodes, and said signal processing means operate sequentially on said voltage pulses to produce said output signal.

3. The improvement of claim 2 wherein said sequencing means comprise means for communication between said signal processing means and said ultrasonic generator.

4. The improvement of claim 3 further comprising switch means in said signal processing means for disconnecting at least a part of said signal processing means from said electrodes, said switch means being activated by said sequencing means to protect said signal processing means while said signal processing means are in their hold state.

5. The improvement of claim 4 wherein said signal processing means comprise a differential amplifier, said differential amplifier receiving signals from each electrode and producing a flow-dependent signal, said switch means being connected in said signal processing means substantially directly following said differential amplifier.

6. The improvement of claim 4 wherein said ultrasonic generator comprises means for intermittently initiating activation of said tranducers and means for producing a warning signal at said sequencing means indicative of activation of said transducers prior to activation of said transducers.

7. The improvement of claim 6 wherein said sequencing means respond to said warning signal by sensing the end of a pulse processing sequence and thereafter open said switch until said warning signal is removed.

8. The improvement of claim 6 wherein said sequencing means respond to said warning signal by sensing the end of a pulse processing sequence, thereafter open said switch, and thereafter send a proceed signal to said ultrasonic generator.

9. The improvement of claim 4 wherein said sequencing means periodically stop said signal processing means in a hold state at the end of a pulse processing sequence and signal said ultrasonic generator to activate said transducers.

* * * * *